United States Patent
Miyazaki et al.

(10) Patent No.: US 6,176,910 B1
(45) Date of Patent: Jan. 23, 2001

(54) PSEUDOPLASTIC WATER BASED INK FOR BALLPOINT PEN

(75) Inventors: Shigeru Miyazaki; Yoji Takeuchi; Masaru Miyamoto, all of Yokohama (JP)

(73) Assignee: Mitsubishi Pencil Kabushiki Kaisha, Tokyo (JP)

( * ) Notice: Under 35 U.S.C. 154(b), the term of this patent shall be extended for 0 days.

(21) Appl. No.: 09/341,532

(22) PCT Filed: Jan. 12, 1998

(86) PCT No.: PCT/JP98/00067

§ 371 Date: Jul. 9, 1999

§ 102(e) Date: Jul. 9, 1999

(87) PCT Pub. No.: WO98/31755

PCT Pub. Date: Jul. 23, 1998

(30) Foreign Application Priority Data

Jan. 20, 1997 (JP) .................................................... 9-007941
Jan. 28, 1997 (JP) .................................................... 9-013758

(51) Int. Cl.⁷ .................................................... C09D 11/00

(52) U.S. Cl. .................................... 106/31.36; 106/31.68; 106/31.43; 106/31.75; 106/31.58; 106/31.86

(58) Field of Search ............................. 106/31.36, 31.68, 106/31.38, 31.7, 31.43, 31.75, 31.58, 31.86

(56) References Cited

U.S. PATENT DOCUMENTS

| | | | |
|---|---|---|---|
| 3,949,132 | * 4/1976 | Seregely et al. ...................... | 428/207 |
| 4,163,675 | * 8/1979 | Hirano et al. ...................... | 106/31.43 |
| 4,592,756 | * 6/1986 | Kawasaki et al. ................ | 106/31.52 |
| 5,302,195 | * 4/1994 | Helbrecht et al. ................ | 106/31.36 |
| 5,667,572 | * 9/1997 | Taniguchi et al. ................ | 106/31.36 |
| 5,854,320 | * 12/1998 | Nakamura et al. .................... | 524/48 |
| 5,954,866 | * 9/1999 | Ohta et al. ........................ | 106/31.89 |

* cited by examiner

*Primary Examiner*—Mark L. Bell
*Assistant Examiner*—Veronica F. Faison
(74) *Attorney, Agent, or Firm*—Darby & Darby

(57) ABSTRACT

Provided is a water based ink for a writing instrument comprising at least a colorant, a dispersant, water and a polar solvent, wherein the ink contains 0.5 to 20% by weight of dextrin or maltodextrin based on the weight of the whole ink. It has an excellent drying resistance.

2 Claims, No Drawings

PSEUDOPLASTIC WATER BASED INK FOR BALLPOINT PEN

TECHNICAL FIELD

The present invention relates to a novel water based ink for a writing instrument, more specifically to a water based ink for a writing instrument having an excellent drying resistance including a pseudoplastic water based ink for a ballpoint pen.

BACKGROUND ART

Inks for a ballpoint pen include usually a low-viscosity water based ink for a ballpoint pen which contains a solvent comprising a water based solvent such as water and has an ink viscosity of 10 mPa.s or less and an oil based ink which contains a solvent comprising an oil based solvent such as a mineral oil, a polyhydric alcohol, a fatty acid and Cellosolve and has an ink viscosity of 1000 to 20000 mPa.s.

A ballpoint pen using an oil based ink for a ballpoint pen has such structure that the ink adhered on a ball at a pen tip through an ink reservoir having a small diameter is transferred onto a paper surface by rotation of the ball and only the transferred portion of the ink is fed to the ball from the reservoir.

A ballpoint pen using a water based ink for a ballpoint pen has such structure that the ink is fed to a ball surface and a paper surface by virtue of capillary action of a feed prepared by binding fine fibers.

While the foregoing water based ink for a ballpoint pen and the oil based ink for a ballpoint pen each have excellent advantages, they also have various problems, respectively. For example, since the water based ink for a ballpoint pen has a low viscosity, the ink is fed by means of making use of a principle of capillary action, and a ballpoint pen using this allows the capillary action to work on the contact point thereof to feed the ink only if the point portion of the ballpoint pen is simply brought into contact with paper and makes it possible to write fine lines on a paper surface without applying so higher writing pressure, so that splitting, starving and blobbing scarcely take place. On the contrary, storing the ink directly in the ink reservoir allows the ink to seep due to vibrations, impacts and a rise in a open air temperature to make the amount of the ink to be fed to the ball unstable. Accordingly, complicated structure having a feed prepared by binding fine fibers is required. Further, involved is the problem that it is difficult to check the remaining amount of the ink.

On the other hand, a ballpoint pen using an oil based ink for a ballpoint pen is characterized by that because of a high viscosity of the ink, blobbing of the ink from the pen point can be prevented and the ink can be stored directly in the ink reservoir having a small diameter, so that the structure of the ballpoint pen can be simplified and that the remaining amount of the ink can be checked by using a transparent material for the ink reservoir. On the other hand, there are involved the problems that since the ink is transferred only on a paper surface contacted with the rotating ball, splitting and starving are liable to be caused if the ball rotates unstably and that since the ink hardly penetrates into the paper surface, blobbing which causes stain with the untransferred ink is apt to be caused.

In recent years, in order to solve such problems, provided are water based inks for a ballpoint pen in which a gelatinizer or a water-soluble paste are added to impart a specific viscosity characteristic (hereinafter referred to as a pseudoplastic water based ink).

A ballpoint pen using this pseudoplastic water based ink is reduced in an ink viscosity because shear force is applied to the ink due to the rotation of the ball at the tip point at the time of writing, and can write as smoothly as a ballpoint pens using a water based ink and make fine lines on the paper surface. Further, blobbing of the ink from the pen point can be prevented because the ink has a high viscosity when the pen is not used for writing. The ballpoint pen using this pseudoplastic water based ink can store the ink directly into the ink reservoir and simplify the structure thereof, and the use of a transparent material for the ink reservoir makes it possible to check the remaining amount of the ink.

Thus, the use of the pseudoplastic water based ink for a ballpoint pen provides a writing instrument having both characteristics of a ballpoint pen using a water based ink and a ballpoint pen using an oil based ink.

A water based ink contains water as a principal solvent and therefore has the defect that if water contained therein evaporated, dissolved substances and mixtures contained in the ink are concentrated, deposited, dried and solidified at the point of the writing instrument to cause clogging and a rise in the viscosity of the ink and bring about troubles in writing. Accordingly, it has so far been proposed to add a less volatile agent for solubilizing a dye or a less volatile aid for dissolving a dye such as urea, thiourea, polyhydric alcohols or derivatives thereof, tetrahydrofurfuryl alcohol, 4-methoxy-4-methylpentane-2-one and ethylene oxide adducts of p-toluenesulfonamide and thiodiethanol, alkanolamine, and sorbitol.

However, inks blended with the various additives described above have not been satisfactory for writing instruments because of the reasons that the drying resistant effect is insufficient and the additives themselves have toxicity and therefore are not suitable as additives and that the viscosities of the inks grow large to bring about inferior follow-up of the inks.

Thus, an object of the present invention is to provide a water based ink for a writing instrument which has an excellent drying resistance and is safe and in which the viscosity does not rise. In particular, a water based ink which is suitable as a pseudoplastic water based ink for a ballpoint pen is provided.

DISCLOSURE OF THE INVENTION

The present invention provides a water based ink for a writing instrument comprising at least a colorant, a dispersant, water and a polar solvent, wherein the ink contains 0.5 to 20% by weight of dextrin or maltodextrin based on the weight of the whole ink. In particular, a pseudoplastic water based ink for a ballpoint pen comprising a viscosity-controlling agent as well as at least a colorant, a dispersant, water, a polar solvent is one preferred embodiment of the present invention.

Other prescribed water soluble organic solvents may be added to the water based ink for a writing instrument of the present invention alone or in combination of a plurality thereof.

BEST MODE FOR CARRYING OUT THE INVENTION

The components used in the water based ink for a writing instrument of the present invention shall be described.

Dextrin and maltodextrin added to the water based ink for a writing instrument in the present invention are non-toxic and safe saccharides which are usually used as an edible sweetening and is characterized by that they have a high solubility in water and have a very excellent water retentivity.

Accordingly, a water based ink for a writing instrument containing this dextrin or maltodextrin is safe and makes it possible to elevate drying resistance without bringing about a problem that the ink viscosity is increased with the lapse of time.

Since dextrin or maltodextrin does not exert an adverse influence on the properties of water based inks usually used and does not change a hydrogen ion concentration in the ink, it does not exert an adverse influence on anionic and cationic substances and therefore has the advantage that a colorant can optionally be selected from all of water based dyes and organic or inorganic pigments.

The content of dextrin or maltodextrin in the water based ink of the present invention is preferably 0.5 to 20% by weight based on the weight of the whole ink. If the content is smaller than 0.5% by weight, the effect on the drying resistance is reduced, and if it is larger than 20% by weight, the spinnability becomes stronger, so that the writing feeling is deteriorated.

All dyes and pigments which can be dissolved or dispersed in water based solvents can be used as the colorant. To give specific examples thereof, there can be used, acid dyes such as Eosine, Floxine, Water Yellow #6-C, acid red, Water Blue #105, Brilliant Blue FCF and Nigrosine NB, direct dyes such as Direct Black 154, Direct Sky Blue 5B and Violet BB, basic dyes such as Rhodamine and Methyl Violet, inorganic pigments such as titanium dioxide, carbon black and ultramarine, organic pigments such as Copper Phthalocyanine Blue and Benzidine Yellow, and various metal powders. They can be used alone or in a mixture of two or more kinds thereof.

When a pigment is used as the colorant, a water-soluble polymer dispersant and a surfactant have to be suitably selected and blended. The water-soluble polymer includes anionic polymers such as polyacrylic acid salts, salts of a styrene-acrylic acid copolymer, salts of a styrene-maleic acid copolymer, salts of a vinylnaphthalene-maleic acid copolymer and a β-naphthalenesulfonic acid-formalin condensation product, and nonionic polymers such as polyvinyl alcohol, polyvinylpyrrolodone and polyethylene glycol.

Water can be used as the principal solvent, and all solvents having polar groups which are missible with water can be used as the polar solvent. There can be used, for example, ethylene glycol, diethylene glycol, triethylene glycol, polyethylene glycol, propylene glycol, ethylene glycol monomethyl ether, glycerin, pyrrolidone and triethanolamine.

The viscosity-controlling agent is used for providing the ink with a pseudoplasticity, and to be specific, there can be used polyacrylic acid salts, cross-linking type acrylic acid polymers, salts of a styrene-acrylic acid copolymer, salts of a styrene-maleic acid copolymer, nonionic polymers such as polyvinylpyrrolodone and polyethylene glycol, and polysaccharides such as xanthane gum, guar gum, casein, gum arabic, gelatin, carrageenan, alginic acid, tragacanth gum, and locust bean gum.

Further, the ink which is controlled by these viscosity-controlling agents has a viscosity falling preferably in a range of 100 to 4000 mPa.s when the shearing rate is 3.84 $s^{-1}$. If the viscosity is lower than 100 mPa.s under the condition described above, the ink is blobbed from the pen tip. Further, when a colorant having a large specific gravity such as titanium dioxide and metal powder is used, the viscosity has to be controlled rather high in order to prevent the colorant from settling, and the upper limit thereof is preferably 4000 mPa.s. If the upper limit exceeds 4000 mPa.s, there is a risk to bring about a reduction in the writing property due to inferior follow-up of the ink.

Other controlling agents than the components described above which can be used if necessary include a lubricant such as polyalkylene glycol derivatives, fatty acid alkali salts, nonionic surfactants and fluorine base surfactants, a rust preventive such as benzotriazole and saponins, a pH controlling agent such as potassium hydroxide and potassium phosphate, and a preservative such as sodium omadine and 1,2-benzoisothiazoline.

The water based ink for a writing instrument of the present invention can easily be obtained by a production method in which the components described above are dissolved, if necessary, with heating and mixed under stirring.

EXAMPLES

The present invention shall more specifically be explained below with reference to examples, but the present invention shall by no means be restricted by these examples.

Example 1

A blue, water based pigment ink for a ballpoint pen was prepared according to the following recipe:

| | |
|---|---|
| Phthalocyanine blue | 8.0% by weight |
| Styrene-acrylic acid resin ammonium salt | 3.0% by weight |
| Ethylene glycol | 20.0% by weight |
| Dextrin | 5.0% by weight |
| Phosphoric acid ester | 0.7% by weight |
| Bioden | 0.3% by weight |
| Aminomethylpropanol | 0.3% by weight |
| Benzotriazole | 0.2% by weight |
| Ion-exchanged water | balance |

Example 2

A blue, water based pigment ink for a ballpoint pen was prepared according to the following recipe:

| | |
|---|---|
| Phthalocyanine blue | 8.0% by weight |
| Styrene-acrylic acid resin ammonium salt | 3.0% by weight |
| Ethylene glycol | 20.0% by weight |
| Maltodextrin | 4.0% by weight |
| Phosphoric acid ester | 0.5% by weight |
| Bioden | 0.3% by weight |
| Aminomethylpropanol | 0.3% by weight |
| Benzotriazole | 0.2% by weight |
| Ion-exchanged water | balance |

Example 3

A black, water based ink for a felt-tip pen was prepared according to the following recipe:

| | |
|---|---|
| Carbon black | 8.0% by weight |
| Styrene-acrylic acid resin ammonium salt | 3.0% by weight |

-continued

| | |
|---|---|
| Maltodextrin | 3.0% by weight |
| Ethylene glycol | 20.0% by weight |
| Bioden | 0.3% by weight |
| Aminomethylpropanol | 0.3% by weight |
| Benzotriazole | 0.2% by weight |
| Ion-exchanged water | balance |

Comparative Example 1

Dextrin was removed from the ink of Example 1 to prepare a blue, water based ink for a ballpoint pen.

Comparative Example 2

Maltodextrin was removed from the ink of Example 2 and 5% by weight of urea was added to prepare a blue, water based ink for a ballpoint pen.

Comparative Example 3

Maltodextrin was removed from the ink of Example 3 to prepare a black, water based ink for a felt-tip pen.

The inks obtained according to the foregoing recipes of Examples 1 to 2 and the inks obtained according to the recipes of Comparative Examples 1 to 2 were charged respectively into ballpoint pens having a ball diameter of 0.7 mm, and the inks obtained according to the recipes of Example 3 and Comparative Example 3 were charged respectively into commercially available felt-tip pens. They were left standing with the caps unfastened, and the time passed until starving was caused was determined. Further, a change in the viscosity of the inks was observed after stored at 50° C. for one month. The results thereof are shown in Table 1.

TABLE 1 performance evaluation of the inks

| | Example | | | Comparative Example | | |
|---|---|---|---|---|---|---|
| | 1 | 2 | 3 | 1 | 2 | 3 |
| Time until starving | 30 days | 30 days | 16 hours | 15 days | 20 days | 5 hours |
| Viscosity change | None | None | None | None | Rise | None |

Example 4

A blue, pseudoplastic water based pigment ink for a ballpoint pen was prepared according to the following recipe:

| | |
|---|---|
| Phthalocyanine blue | 8.0% by weight |
| Styrene-acrylic acid resin ammonium salt | 3.0% by weight |
| Ethylene glycol | 20.0% by weight |
| Dextrin | 5.0% by weight |
| Phosphoric acid ester | 0.7% by weight |
| Bioden | 0.3% by weight |
| Aminomethylpropanol | 0.3% by weight |
| Benzotriazole | 0.2% by weight |

-continued

| | |
|---|---|
| Polyacrylic acid salt (acryl base synthetic polymer) | 0.4% by weight |
| Ion-exchanged water | balance |

Example 5

A blue, pseudoplastic water based pigment ink for a ballpoint pen was prepared according to the following recipe:

| | |
|---|---|
| Phthalocyanine blue | 8.0% by weight |
| Styrene-acrylic acid resin ammonium salt | 3.0% by weight |
| Ethylene glycol | 20.0% by weight |
| Maltodextrin | 4.0% by weight |
| Phosphoric acid ester | 0.5% by weight |
| Bioden | 0.3% by weight |
| Aminomethylpropanol | 0.3% by weight |
| Benzotriazole | 0.2% by weight |
| Polyacrylic acid salt (acryl base synthetic polymer) | 0.4% by weight |
| Ion-exchanged water | balance |

Example 6

A black, pseudoplastic water based pigment ink for a ballpoint pen was prepared according to the following recipe:

| | |
|---|---|
| Carbon black | 8.0% by weight |
| Styrene-acrylic acid resin ammonium salt | 3.0% by weight |
| Maltodextrin | 3.0% by weight |
| Potash soap | 0.5% by weight |
| Propylene glycol | 20.0% by weight |
| Bioden | 0.3% by weight |
| Aminomethylpropanol | 0.3% by weight |
| Benzotriazole | 0.2% by weight |
| Cross-linking type acrylic acid polymer | 0.4% by weight |
| Ion-exchanged water | balance |

Comparative Example 4

Dextrin was removed from the ink of Example 4 to prepare a blue, water based ink for a ballpoint pen.

Comparative Example 5

Maltodextrin was removed from the ink of Example 5 and 5% by weight of urea was added to prepare a blue, water based ink for a ballpoint pen.

Comparative Example 6

Maltodextrin was removed from the ink of Example 6 to prepare a black, water based ink for a ballpoint pen.

The inks obtained according to the foregoing recipes of Examples 4 to 6 and the inks obtained according to the recipes of Comparative Examples 4 to 6 were charged respectively into ballpoint pens having a ball diameter of 1.0 mm. They were left standing with the caps unfastened, and the time passed until starving was caused was determined. Further, the viscosity of the initial inks at a shearing rate of 3.84 s$^{-1}$ and a change in the viscosity of the inks after stored at 50° C. for one month were observed. The results thereof are shown in Table 2.

TABLE 2 performance evaluation of the inks

| | Example | | | Comparative Example | | |
|---|---|---|---|---|---|---|
| | 4 | 5 | 6 | 4 | 5 | 6 |
| Time until starving | 10 days | 14 days | 14 days | 3 days | 5 days | 5 days |
| Initial Viscosity of ink (mPa · s) | 700 | 500 | 500 | 750 | 800 | 550 |
| Viscosity change | None | None | None | None | Rise | None |

INDUSTRIAL APPLICABILITY

The water based ink of the present invention for a writing instrument is very safe and does not bring about the trouble that the viscosity rises with the passage of time. It has a very excellent drought resistance and is suitable to felt-tip pens and ballpoint pens, and particularly the pseudoplastic water based ink is suited to ballpoint pens using a water based ink.

What is claimed is:

1. A pseudoplastic water based ink for a ball point pen comprising at least a colorant, a dispersant, water, a polar solvent and a viscosity-controlling agent, wherein said ink contains 0.5 to 20% by weight of dextrin or maltodextrin based on the weight of the whole ink, wherein said ink has a viscosity of 100 to 4,000 mPa's at a shearing rate of 3.84 $s^{-1}$.

2. The pseudoplastic water based ink for a ballpoint pen as described in claim 1, wherein the viscosity-controlling agent is at least one selected from polyacrylic acid salts, cross-linking type acrylic acid polymers, salts of a styrene-acrylic acid copolymer, salts of a styrene-maleic acid copolymer, polyvinylpyrrolidone, polyethylene glycol, xanthan gum, guar gum, casein, gum arabic, gelatin, carrageenan, alginic acid, tragacanth gum, and locust bean gum.

* * * * *